UNITED STATES PATENT OFFICE.

OTTO LELLEP, OF NEW YORK, N. Y.

METHOD OF TREATING NICKEL-MATTE OR NICKEL-COPPER MATTE.

1,278,176.

Specification of Letters Patent. Patented Sept. 10, 1918.

No Drawing. Application filed October 11, 1917. Serial No. 195,912.

*To all whom it may concern:*

Be it known that I, OTTO LELLEP, a citizen of Russia, residing at 111 West 76th street, New York city, county and State of New York, have made a certain new and useful Invention in Methods of Treating Nickel-Matte or Nickel-Copper Matte, of which the following is a specification.

The object of this invention is to provide a method of treating nickel matte and nickel-copper matte to produce metallic nickel and nickel-copper alloy.

A further object of the invention is to provide a method of treating nickel matte and nickel-copper matte to eliminate the sulfur contained therein.

Other objects of the invention will appear more fully hereinafter.

The invention consists substantially in the mode of operation hereinafter set forth and finally pointed out in the appended claims.

According to the method heretofore practised of treating nickel matte for the elimination of the sulfur contained therein, the matte is subjected to roasting, which operation, on account of the great affinity between sulfur and nickel, has heretofore been carried out in two stages, requiring several steps of operation.

The matte is first crushed and then ground and the ground mass is subjected to a preliminary roasting at a temperature of about 800° C. The roasted mass, consisting chiefly of nickel oxid, but still containing more or less sulfur, is then again ground and subjected to "sweet" roasting at a temperature of about 1200° C. The resulting mass consisting of nickel oxid is mixed with ground coal, charcoal or the like, and is finally reduced in a furnace at a high temperature to metallic nickel. There are many serious objections to this method of treating nickel matte in the production of metallic nickel. In the first place, the material operated on is required to be handled repeatedly; large expense is incurred in labor and materials required; serious losses occur because of the powdered state to which it is necessary to reduce the matte and oxid; the carrying out of the process consumes valuable time; various and expensive apparatus is required; and a large amount of floor space is occupied; many separate operations are required; opportunity is afforded for dishonesty of employees in filching the powdered matte or oxid during the repeated handlings thereof; and loss of efficiency is experienced in that the heat in one operation is not utilized to the best advantage in succeeding operations.

It is among the special purposes of my present invention to provide a method of treating nickel matte and nickel-copper matte, which avoids these and other objections and wherein in one operation the matte is converted directly into metallic nickel in the case of nickel matte and into nickel-copper alloy in the case of nickel-copper matte.

The process of obtaining metallic nickel by direct converting of nickel matte according to general acceptation has been considered impossible, although experimentation has shown that a partial reaction between nickel-oxid and nickel sulfid takes place according to the formula

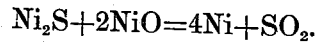

$$Ni_2S+2NiO=4Ni+SO_2.$$

In the attempt to practice this reaction in nickel metallurgy, however, this reaction could not be used commercially because it was found to be incomplete and reverted in opposite direction at ordinary furnace temperature.

I have found, however, that the reaction between oxids and sulfids of nickel resulting in the production of practically desulfurized metallic nickel—can be easily and practically obtained, provided, first, the temperature is high enough, and second, the surrounding medium—the walls of the reaction vessel and the surrounding gases—do not interfere with the existence of nickel-oxid which is easily reduced and is readily combined with silica. Therefore, in carrying out my invention, I propose to subject the nickel-matte to a very high temperature and to carry out the reaction in a neutral or oxidizing atmosphere and upon a neutral or basic hearth—that is, a hearth which is non-acidic in its reaction with nickel oxid. The fact is that by oxidizing nickel matte at high temperature by air, sulfur is eliminated from the matte, there remaining metallic nickel. In practical operation an excess of oxygen may sometimes be used to more completely remove the sulfur and which excess of oxygen when so employed may reoxidize some of the metal. In such case the oxidized metal is subsequently reduced by a suitable reducing agent as hereinafter set forth. The ordinary explanation for the removal of sulfur is the preliminary formation of nickel oxid in the mass and an immediate reaction of this oxid with sulfid. But an elimination of sulfur according to the reaction

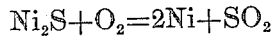

seems possible. In this manner, as I have demonstrated, the above reaction is obtained and realized with the result of producing practically, and under easily workable commercial conditions, metallic nickel, without large losses and practically free from sulfur.

As a result of my discovery that with a sufficiently high temperature and the elimination of interfering surrounding media, the reaction for recovering desulfurized metallic nickel from nickel matte and nickel-copper alloy from nickel-copper matte can be carried out practically, easily and commercially. I am led to believe that the failures of former efforts to attain success according to the ordinary converting processes heretofore tried is due to the fact that a sufficiently high temperature has not heretofore been employed or the elimination of disturbing surrounding media has not been accomplished.

In carrying out my invention, I propose to employ a sufficiently high temperature obtained from outside sources, either electrically or otherwise, and to eliminate disturbing surrounding influences by employing a neutral or basic furnace lining, and I am therefore enabled to effect practically and successfully the direct converting of nickel matte into metallic nickel, or nickel-copper matte into nickel-copper alloy, in one operation.

As above indicated the manner of obtaining the necessary temperature is unimportant as the same may be attained in a neutrally or basically lined regenerative, reverberatory furnace, in an electrical furnace, or otherwise as may be most convenient.

In carrying out my invention, I accomplish the direct oxidation of sulfur of the matte by projecting an air-blast there-through or by oxidizing the matte on the surface by an oxidizing atmosphere, or by the use of an oxidizing agent, such as nickel oxid or any other metallic oxid or salt giving off oxygen, any excess of oxygen being removed by a suitable reducing agent such as carbon, carbon monoxid, magnesium, or the like.

In order to effect complete elimination of sulfur from the matte I prefer to slightly over-oxidize the mass by employing a slight excess of air-blast or other oxidizing agent and subsequently reducing the resulting oxid with a suitable reducing agent.

As an example for practically carrying out my process, the matte to be treated is delivered into a suitable furnace or converter with an outside source of heat and while still heated to a liquid state from previous operations required in producing the matte. This temperature according to present practice will be approximately 1000° to 1200° C. Thus I am enabled to utilize the heat of the previous operations, thereby resulting in great economy. The temperature of the mass is then raised to a point at which the reaction velocity for sulfur elimination is greater than for the formation of nickel oxid in order to effect and insure a quick reaction between the oxids and sulfids of nickel when the oxidizing agent is supplied. I have found that the range of temperature required to effect the quick reaction varies somewhat with the character and composition, or percentage of sulfur content of the matte. Theoretically this range of temperature may be the melting point of the matte and the melting point of nickel oxid. For practical and commercial purposes, however, good results are not obtained at a temperature much below the melting point of metallic nickel which is 1450° C. The melting point of the matte varies, but 1000° C would be a fair average, and the melting point of nickel oxid is about 1850° C. In practice, I have found 1750° C. a good working temperature for practical use in effecting the desired reaction to obtain copper-free nickel.

A convenient method is to supply a blast of air through the mass, although as above indicated a surface oxidation by the oxygen or other oxidizing agents may be employed.

As above indicated, I prefer to slightly over-oxidize the mass through a slight excess of oxidizing agent and thereafter reducing the resulting oxids with carbon, carbon monoxid, magnesium or the like.

In order to insure the production of a pure metallic nickel, in the case of nickel matte and pure nickel-copper alloy in the case of nickel-copper matte it is necessary that even the last traces of sulfur be removed from the mass. This removal of any remaining trace of sulfur may be effected in various ways. One method I have found effective is, to treat the metal at high temperature with a basic slag containing calcium carbid ($CaC_2$), added to the slag as such, or formed during the process by introducing carbon according to the reaction

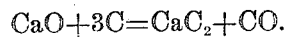

According to another method of carrying out my invention, the production of metallic nickel is accomplished as a result of the reaction of oxids of nickel and sulfids of nickel. According to this method, a portion of the nickel matte ($Ni_2S$) is converted into nickel-oxid (NiO). The nickel oxid is then mixed with the matte and the whole mass is then subjected to high temperature, say 1750° C. in a furnace.

According to another method of carrying out my process, metallic nickel is produced by first partially roasting the matte, after which there remains in the mass some $Ni_2S$, but part of the matte is converted into nickel oxid NiO. This mass so composed as a result of the partial roasting is then subjected to high temperature, say for example, 1750°C. in a furnace.

In all cases, as above described the reaction $$Ni_2S + 2NiO = 4Ni + SO_2$$

is realized.

Where in carrying out my process overoxidizing action takes place by the use of an excess of oxidizing agent, the subsequent reduction is accomplished by a reducing agent according to the following formulas $$NiO + C = Ni + CO$$

or $$NiO + CO = Ni + CO_2,$$

thereby securing the metallic nickel product sought.

Where nickel-copper matte is treated according to my invention for the production of the corresponding alloy a lower temperature may be sufficient, depending upon the percentage of copper contained in the matte.

Having now set forth the object and nature of my invention and the manner of carrying the same into practical operation what I claim as new and useful and of my own invention and desire to secure by Letters Patent is:—

1. The method which consists in subjecting nickel containing matte to the action of an oxidizing agent at a temperature between the melting point of the metal to be produced and that of nickel oxid under non-acidic furnace conditions.

2. The method which consists in subjecting nickel containing matte to the action of an oxidizing agent at a temperature of approximately 1750° C. under non-acidic furnace conditions.

3. The method which consists in effecting by external heat a reaction between nickel oxids and nickel sulfids at a temperature intermediate the melting point of the metal produced and its oxids under non-acidic furnace conditions.

4. The method which consists in effecting by external heat a reaction between nickel oxids and nickel sulfids at a temperature intermediate the melting point of the nickel and its oxids under non-acidic furnace conditions and finally removing any remaining sulfur.

5. The method which consists in effecting by external heat a reaction between nickel oxids and nickel sulfids at a temperature intermediate the melting point of the nickel and its oxids under non-acidic furnace conditions and finally removing with a basic slag any remaining sulfur.

6. The method which consists in effecting by external heat a reaction between nickel oxids and nickel sulfids at a temperature intermediate the melting point of the nickel and its oxids under non-acidic furnace conditions and finally removing with slag containing calcium carbid any remaining sulfur.

7. The method which consists in effecting a quick reaction between oxids and sulfids of nickel at a temperature between the melting points of the nickel and its oxids under non-acidic furnace conditions the oxids being in slight excess.

8. The method which consists in effecting a quick reaction between oxids and sulfids of nickel at a temperature between the melting points of the metal produced and its oxids under non-acidic furnace conditions the oxids being in slight excess and finally reducing the mass with a reducing agent.

9. The method which consists in effecting a quick reaction between oxids and sulfids of nickel at a temperature between the melting points of the nickel and its oxids under non-acidic furnace conditions the oxids being in slight excess, and finally reducing the mass with carbon.

10. The process which consists in subjecting nickel-containing matte to the action of an oxidizing agent in excess at a temperature between the melting point of the nickel and that of nickel oxid under non-acidic furnace conditions and reducing the resulting mass and finally removing substantially all remaining sulfur.

11. The process which consists in subjecting nickel containing matte to the action of an oxidizing agent in excess at a temperature between the melting point of the nickel and that of nickel oxid under non-acidic furnace conditions and then reducing the resulting mass with a reducing agent and finally eliminating substantially all remaining sulfur.

12. The process which consists in treating nickel containing matte while still in the melted state from its production, by increasing with external heat the temperature thereof in the presence of an oxidizing agent and under non-acidic furnace conditions.

13. The process which consists in subjecting nickel containing matte to the action of an oxidizing agent and hastening the reaction by the application of external heat and a temperature above the melting point of nickel.

14. The method which consists in subjecting nickel containing matte to the action of an oxidizing agent at a temperature at which the reaction velocity for sulfur elimination is greater than for formation of nickel oxid and under non-acidic furnace conditions.

15. The method which consists in subjecting nickel containing matte and an oxidizing agent to the action of external heat to a degree above that of the melting point of nickel under non-acidic furnace conditions.

16. The method which consists in subjecting nickel containing matte to the action of an oxidizing agent at a temperature between the melting point of the matte and that of nickel oxid under non-reacting furnace conditions.

In testimony whereof, I have hereunto set my hand on this 8th day of October A. D. 1917.

OTTO LELLEP.